Patented May 9, 1950

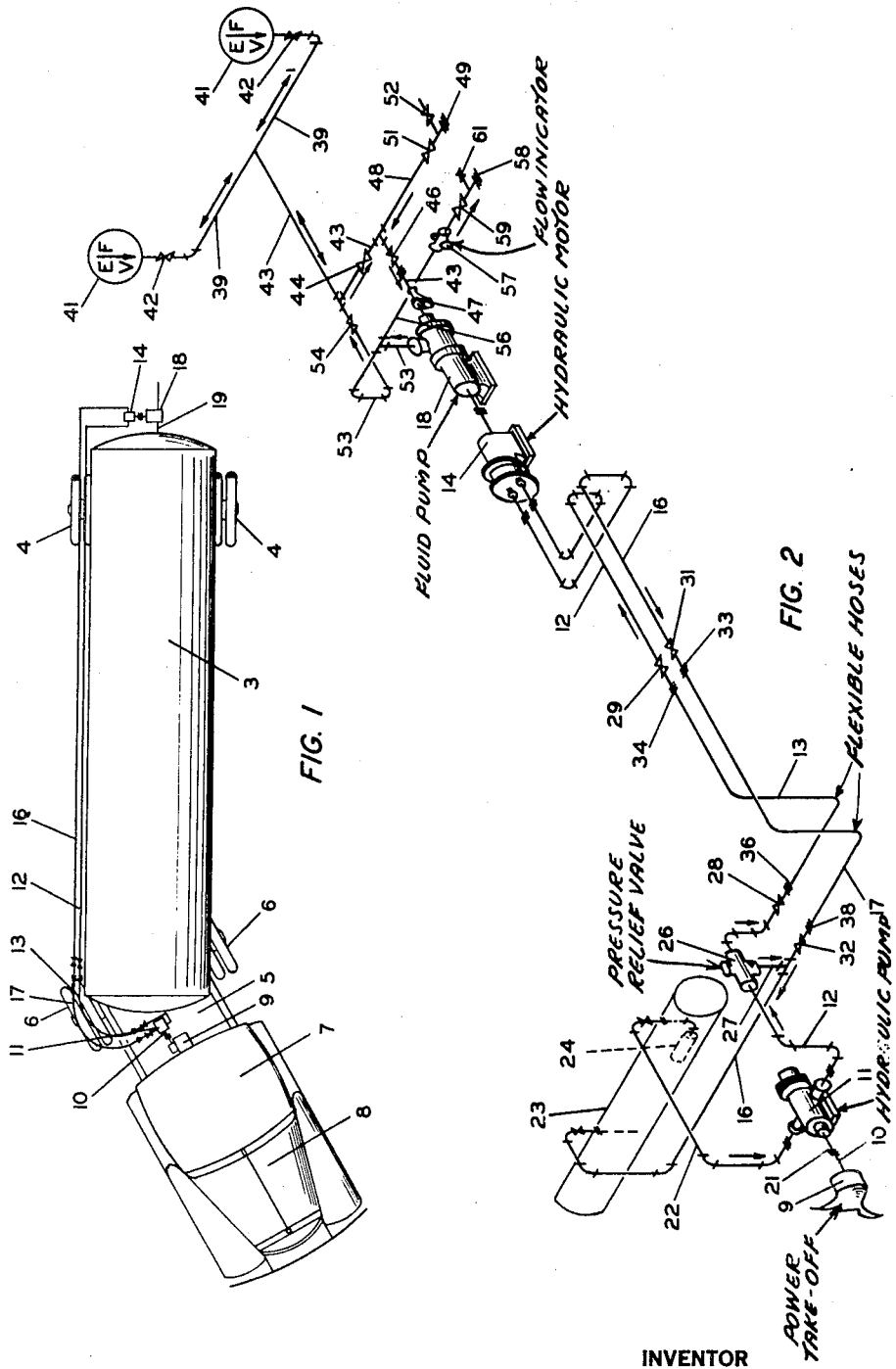

2,506,911

UNITED STATES PATENT OFFICE 2,506,911

PUMP FOR TRACTOR-DRAWN TRAILER TANKS

Harry R. Zeigler, Bartlesville, Okla., assignor to Phillips Petroleum Company, a corporation of Delaware Application August 3, 1945, Serial No. 608,694

2 Claims. (Cl. 62—1)

This invention relates to pumping systems. In a more specific aspect, it relates to a pumping system for a tank on a trailer having a pump thereon. In a more specific aspect it relates to a tractor-drawn trailer tank having a pump which is driven from the motor of the tractor.

It is customary in handling large quantities of fluid to transport the fluid in a tank mounted on a trailer which is pivoted to and drawn by a tractor. In order to transfer the fluid from the trailer, it is necessary to have a pump on the tank of the trailer. When the fluid is liquefied petroleum gas, it is desirable to have all tank connections near the rear end of the tank, and thereby far away from the tractor to avoid accidental ignition of any escaping gas which would result in a fire.

In the prior art, great difficulty has been experienced with such pumps. It is necessary to have a pump to handle liquid petroleum gas but it is not desirable to have an electric motor drive or other drive for the pump that might start a fire. The problem is complicated when the trailer type truck is used as the tank trailer pivots relative to the tractor or truck that hauls the trailer.

Various expedients have been proposed in the prior art for driving the pump but have not proved practical because of safety hazards involved or the complicated mechanical hookup required which would not give good service.

I have installed a pump on a tank trailer and obtained motive power from the engine of the tractor which hauls the trailer by means of a hydraulic transmission which will allow the trailer to pivot freely and which is safe and not subject to mechanical failure or danger of fire, and have invented a suitable system embodying many advantages and capable of carrying out the following objects:

One object of my invention is to provide a pumping system for a tank trailer driven by the motor of the tractor.

Another object is to provide a pumping system for a tank trailer that is fireproof and safe, and allows easy disconnection of the tractor.

Another object is to provide a pumping system driven by the tractor motor which allows pivoting of the trailer and which is not liable to break down, and in which the transfer pump is near the tank outlet.

Another object is to provide a simple inexpensive means for transferring fluids connected to a tank trailer.

Numerous other objects and advantages will be apparent to those skilled in the art upon reading the accompanying specification, claims and drawings.

Figure 1 is a simplified plan view of a tractor and tank trailer embodying my invention.

Figure 2 is a perspective view of a somewhat modified pumping system embodying my invention which may also be applied to the tractor and trailer shown in Figure 1.

In Figure 1 a tank 3 is mounted on a trailer having rear wheels 4. The front end of tank 3 is mounted on the rear of a tractor 5 having rear wheels 6 which bear the load of the front of the trailer. Tractor 5 has the usual driver's cab 7 and a motor which is generally an internal combustion motor (but which may be an electric motor) mounted under hood 8.

The motor under hood 8 has the usual shafting for driving wheels 6, and also is provided with a power take-off 9 in order to provide power to drive the pumping system which will now be described.

The power take-off 9 drives a shaft 10 which in turn drives a hydraulic pump 11 which pumps any suitable hydraulic fluid (such as motor oil) through a hydraulic line 12 having a flexible portion 13. The fluid driven through line 12 drives a hydraulic motor 14 and returns through a hydraulic line 16 having a flexible section 17.

Hydraulic motor 14 drives a pump 18 which pumps fluids through line 19 into or out of the tank 3.

While a simple form of my invention has been shown in Figure 1, I prefer to employ refinements in this system as shown in Figure 2.

In Figure 2 power take-off 9 drives shaft 10 which may be provided with a flexible coupling 21, and through shaft 10 drives hydraulic pump 11. The intake side of pump 11 is connected through a supply line 22 with tank 23 which acts as a storage tank for the hydraulic fluid. In order to remove grit from the system, I prefer to employ a screen inlet 24 inside tank 23 at the end of line 22.

Pump 11 pumps the fluid through pressure line 12 having a flexible portion 13 to drive hydraulic motor 14, and the exhaust of motor 14 returns through a return line 16 having a flexible portion 17 to tank 23. As a safety feature a suitable relief valve 26 is provided in line 12, so that if excess pressure builds up in line 12 this pressure will be relieved through a line 27 connected back into the discharge or return line 16.

In order to allow the removal of flexible sections 13 and 17 without completely dis-assembling the device, cut-off valves 28, 29, 31 and 32 are provided along with hose couplings 33, 34, 36 and 38.

Motor 14 drives fluid transfer pump 18 which is connected by pipes (such as 19 of Figure 1) to the tank 3 of the trailer.

As Figure 2 has a more complicated system of piping connected to tank 3, different members will be used for the piping in Figure 2 that takes the place of simple fluid transfer line 19 of Figure 1.

While only one tank 3 is shown in Figure 1, it is customary to have either one, or two or more tanks, such as tank 3 mounted on a trailer. Figure 2 shows a manifold 39 which may have as many branches as there are tanks, (in the case of Figure 2, two tanks) and obviously if there is only one tank, one branch or manifold 39 may be eliminated. It is customary to provide inside of each tank, or in the wall thereof where it cannot be broken away from the tank, an excess flow valve 41 which will automatically allow fluids to flow from the tank at certain rates of flow but which will close automatically when the flow is above a predetermined value. The predetermined value is such that normal operations of the system will not cause enough flow to shut excess flow valve 41, but if any of the pipes such as 39 are broken the flow will exceed said predetermined value and excess flow valve 41 will prevent further escape of fluid from the tank. Excess flow valves in this position are old, and my invention operates the same way regardless of whether excess flow valves 41 are provided or not. For safety reasons, however, I strongly recommend using excess flow valves 41 as shown.

Just outside of each tank is a cut-off valve 42 which can be closed manually to stop flow of fluid from any one of the tanks, or all of the tanks.

Leading directly from manifold 39, or in case there is only one tank, directly from valve 42, is a fluid transfer line 43. Fluid transfer line 43 has cut-off valves 44 and 46 therein and preferably contains a strainer 47 for the removal of grit. Transfer line 43 leads to the intake of fluid pump 18. A fluid supply line 48 is connected to the transfer line and is provided with a coupling 49, cut-off valve 51 and bleed valve 52.

A fluid pressure line 53 connects the exhaust side of pump 18 with fluid transfer line 43 and contains a cut-off valve 54.

A dispensing line 56 is connected to pressure line 53 and contains a flow indicator 57. Dispensing line 56 ends in a coupling 58 and contains a cut-off valve 59 and a bleed valve 61.

*Operation*

Numerous operations may be performed with the above described systems.

*Loading the tank without pump 18*

A source of liquid under pressure being attached to coupling 49, valves 46, 52 and 54 being closed and valves 42, 44 and 51 being open, the liquid may be forced through supply line 48, liquid transfer line 43, and manifold 39 and valve 41 if 39 and 41 are present, into the tanks. Excess flow valve 41 allows flow either way below the predetermined amount, see R. W. Thomas Patent No. 2,121,936 of June 28, 1938, for an example of a suitable excess flow valve.

When the tanks are loaded, at least valve 51 is closed, and bleed valve 52 is then opened before uncoupling coupling 49. Of course there must be a cut-off valve of some sort on the liquid supply (not shown) which is attached to 49 and which valve is closed before opening valve 52.

*Loading the tank with pump 18*

Valves 51, 52, 61, and 59 being closed and all the other valves being open, the motor 8 of the tractor is started and run with the clutch (not shown) disengaged so that wheels 6 are not driven. Power take-off 9 is then engaged to drive pump 11 which in turn drives motor 14 which drives pump 18 which proceeds to pump fluid around in a circle through pipes 43 and 53. A suitable source of fluid being connected to coupling 49, valve 51 is opened and valve 44 is closed whereupon the fluid passes through line 48, valve 46 and strainer 47 into pump 18 and is then pumped through lines 53 and 43 into manifold 39 and through valves 42 and 41 into the tank.

The operation of bleed valve 52 is the same in this connection as before.

*Dispensing fluid from the tank*

Pump 18 is placed into operation in the same manner as described immediately above and coupling 58 is connected to the tank or other vessel (not shown) into which it is desired to dispense the fluid from tank 3.

Valve 59 is then opened and valve 54 is closed and fluid from tank 3 passes through valve 41, valve 42, manifold 39, liquid transfer line 43, pump 18, lines 53 and 56 out through coupling 58. When sufficient fluid has been dispensed, valve 54 may be opened and valve 59 closed and the system can continue to run. When it is desired to shut down the pump the power take off 9 may be shifted to cut off the power and the engine 8 of the truck may then be shut off.

Upon closing a valve in the tank (not shown) to which the material has been dispensed and closing valve 59, valve 61 may be opened to bleed off fluid so that coupling 58 may be disconnected.

*Operation of safety features*

Screen 24 will prevent grit from entering the system and as any grit forms it will collect in the bottom of tank 23 from which it may be removed by a drain plug (not shown). If anything should clog line 12 or 13 and pump 11 should create a great pressure in line 12, this pressure will be relieved to line 16 by means of relief valve 26 which will by-pass the fluid through line 27 to line 16. Any grit forming in fluid transfer line 43 will be picked up by strainer 47 from which it may be removed from time to time. Flow gauge 57 will show whether fluid is being properly dispensed through line 56. The circuit involving line 53 and 43 is such that pump 18 may pump fluid around in a circle until one of valves 44, 46, or 54 is closed. Obviously before closing one of these valves the proper dispensing valve 59 or loading valve 51 should be opened so that pump 18 may operate properly. However, if any of the valves should be closed improperly pump 18 will merely stall and cause pressure in line 12, which pressure will be relieved by relief valve 26, thus making the system fool proof.

Quick couplings may be substituted for couplings 33, 34, 36 and 38 and in many instances are preferred. These quick couplings (not shown) are well known to the users of hose and they may be provided with automatic valves which close upon disconnection and reopen upon reconnection which valves may take the place of valves 28, 29, 31 and 32.

The word tractor is to be given the broadest meaning and is intend to cover all motor vehicles of any type and all other types of tractors, the word trailer is to cover all types of hauled or pushed vehicles and all other types of trailers, and tractor trailer combination covers all articulated vehicles and trains as well as other tractor trailer combinations.

The safety relief valve 26 is preferably adjustable as to relief pressure and the system can be operated with partial discharge in lines 13 and 27 at the same time in which case the valve 26 acts to limit the speed or discharge pressure of pump 18 depending on conditions in whatever 58 is connected to.

It is obvious therefore that I have devised a pumping system capable of carrying out the objects of the invention and having other objects and advantageous too numerous to enumerate. Various changes in shape, form and general arrangement of the system illustrated may be made without departing from the scope of my invention which scope is defined by the following claims.

Having described my invention, I claim:

1. In combination with a motor driven tractor and a tank trailer pivoted to said tractor, a system for loading the tank of said trailer with fluids and dispensing fluids from said tank comprising in combination a power take-off mounted on said tractor to receive power from the motor of said tractor, a pump mounted on said tractor driven by said power take-off means, a second motor mounted on said trailer, a first flexible fluid conduit connecting the exhaust side of said pump and the intake side of said second motor, a second flexible fluid conduit connecting the exhaust side of said second motor and the intake side of said pump, a third conduit connecting said first and second conduits, a relief valve in said third conduit opening to flow of fluid from said first conduit to said second conduit upon a predetermined pressure in said first conduit, a fluid supply tank interposed between portions of said second conduit, a strainer in said second conduit, a second pump mounted on said trailer driven by said second motor, a fluid transfer line connecting said tank with the intake side of said second pump, a strainer in said fluid transfer line, a fluid supply line connected to said transfer line between said strainer and said tank, a cut-off valve in said transfer line between said fluid supply line and said tank, a cut-off valve in said fluid supply line, a fluid pressure line connecting the output side of said second pump and said transfer line, a dispensing line connected to said fluid pressure line, a cut-off valve in said fluid pressure line between said dispensing line and said transfer line, a flow indicator in said dispensing line and a cut-off valve in said dispensing line.

2. In combination with a motor driven tractor and a tank trailer pivoted to said tractor, a system for loading the tank of said trailer with fluids and dispensing fluids from said tank comprising in combination a power take-off mounted on said tractor to receive power from the motor of said tractor, a pump mounted on said tractor driven by said power take-off means, a second motor mounted on said trailer, a first flexible fluid conduit connecting the exhaust side of said pump and the intake side of said second motor, a second flexible fluid conduit connecting the exhaust side of said second motor and the intake side of said pump, a second pump mounted on said trailer driven by said second motor, a fluid transfer line connecting said tank with the intake side of said second pump, a fluid supply line connected to said transfer line, a cut-off valve in said transfer line between said fluid supply line and said tank, a cut-off valve in said fluid supply line, a fluid pressure line connecting the output side of said second pump and said transfer line, a dispensing line connected to said fluid pressure line, a cut-off valve in said fluid pressure line between said dispensing line and said transfer line, and a cut-off valve in said dispensing line.

HARRY R. ZEIGLER.

REFERENCES CITED

The following references are of record in the file of this patent:

UNITED STATES PATENTS

| Number | Name | Date |
|---|---|---|
| Re. 20,863 | Holby | Sept. 20, 1938 |
| 830,046 | Bole | Sept. 4, 1906 |
| 2,060,484 | Barrett | Nov. 10, 1936 |
| 2,161,153 | Gallun et al. | June 6, 1939 |